(12) United States Patent
Mouli (10) Patent No.: US 7,280,729 B2
(45) Date of Patent: Oct. 9, 2007

(54) SEMICONDUCTOR CONSTRUCTIONS AND LIGHT-DIRECTING CONDUITS

(75) Inventor: Chandra Mouli, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 102 days.

(21) Appl. No.: 11/332,991

(22) Filed: Jan. 17, 2006

(65) Prior Publication Data

US 2007/0165992 A1    Jul. 19, 2007

(51) Int. Cl.
  *G02B 6/02* (2006.01)
  *H01S 3/00* (2006.01)
  *H04B 10/12* (2006.01)

(52) U.S. Cl. .......................... 385/123; 385/132; 372/6; 359/341.1

(58) Field of Classification Search ................ 385/24, 385/129–132, 141–142; 372/6
See application file for complete search history.

(56) References Cited

U.S. PATENT DOCUMENTS

| | | | |
|---|---|---|---|
| 6,430,349 B1 * | 8/2002 | Hayden et al. ............. | 385/132 |
| 2003/0174391 A1 * | 9/2003 | Pan et al. ............. | 359/341.41 |
| 2004/0136681 A1 * | 7/2004 | Drewery et al. ............ | 385/142 |
| 2005/0195472 A1 * | 9/2005 | Tang ......................... | 359/333 |

OTHER PUBLICATIONS

"Characteristics of rare-earth element erbium implanted in silicon"; Y.S. Tang et al; http://ojps.aip.org/aplo/aplcr.jsp; 1989 American Institute of Physics; Appl. Phys. Lett. 55 (5), Jul. 31, 1989 pp. 432-433.

"Electroluminescence at 1.54 µm in Er-doped Si nanocluster-based devices"; F. Iacona et al.; Applied Physics Letters, vol. 8, No. 17; Oct. 21, 2002; pp. 3242-3244.

* cited by examiner

*Primary Examiner*—Hemang Sanghavi
(74) *Attorney, Agent, or Firm*—Wells St. John P.S.

(57) ABSTRACT

The invention includes optical signal conduits having rare earth elements incorporated therein. The optical signal conduits can, for example, contain rare earth elements incorporated within a dielectric material matrix. For instance, erbium or cerium can be within silicon nanocrystals dispersed throughout dielectric material of optical signal conduits. The dielectric material can define a path for the optical signal, and can be wrapped in a sheath which aids in keeping the optical signal along the path. The sheath can include any suitable barrier material, and can, for example, contain one or more metallic materials. The invention also includes methods of forming optical signal conduits, with some of such methods being methods in which the optical signal conduits are formed to be part of semiconductor constructions.

11 Claims, 6 Drawing Sheets

SEMICONDUCTOR CONSTRUCTIONS AND LIGHT-DIRECTING CONDUITS

TECHNICAL FIELD

The invention pertains to semiconductor constructions, methods of forming semiconductor constructions, light-conducting conduits, and optical signal propagation assemblies.

BACKGROUND OF THE INVENTION

There are many applications for optical signals. For instance, optical signals are frequently utilized for transferring data across large distances. Light conducting conduits (such as, for example, fiber optic cables) can be utilized as pathways for the optical signals. The optical signals can, however, become degraded during their travel from one point to another, and accordingly it can be desired to refresh the optical signals at various intervals along the pathways of the signals.

Another use of optical signals is in ultra-fast computers. At very high frequencies, numerous physical effects degrade performance of electrons as dependable carriers of information, rendering the electrons incapable of being utilized for transferring information at ultra-fast processor speeds. However, photons can be viable carriers of information at such ultra-fast processor speeds.

Yet another use of optical signals is for transferring information in processors utilized in environments that can potentially have very high radiation. Although such environments can cause numerous problems for signal transfer utilizing electrons, signal transfer utilizing photons can remain relatively robust under such conditions. Among the applications for utilization of information transfer in high radiation environments are military applications, and outer space technology applications.

The above-listed examples are but a few of the numerous applications that have been developed, or are in the process of being developed, for optical signal technologies. In light of the numerous applications for optical signal technologies, it would be desirable to develop devices and methods for improving optical signal propagation and transfer.

SUMMARY OF THE INVENTION

In one aspect, the invention includes a light-directing conduit. The conduit includes an inner material through which light migrates, and a sheath (or barrier) around the inner material. The sheath is configured to substantially keep the light migrating along a path defined by the inner material. The inner material comprises a matrix having one or more rare earth elements dispersed therein, with a total concentration of the one or more rare earth elements within at least a portion of the matrix being at least about $1\times10^{16}$ atoms/$cm^3$. As is known to persons of ordinary skill in the art, rare earth elements are any of the elements having atomic numbers 58-71.

In one aspect, the invention includes a semiconductor construction comprising a semiconductor substrate, and a waveguide supported by the substrate. The waveguide comprises one or more rare earth elements, with such elements being present to a total concentration of at least about $1\times10^{16}$ atoms/$cm^3$ within at least one segment of the waveguide.

In one aspect, the invention includes an optical signal propagation assembly. The assembly comprises an optical signal input, an optical signal amplifier, an optical signal receiver, and an optical signal conduit. The optical signal amplifier is configured to receive an optical signal from the input and amplify the optical signal, and the optical signal conduit is configured to direct the amplified signal from the amplifier to the receiver. The optical signal amplifier comprises one or more rare earth elements within a matrix material. In particular aspects, the rare earth elements can include one or more of cerium, erbium, neodymium and ytterbium.

In one aspect, the invention includes a method of forming a semiconductor construction. A semiconductor substrate provided, and one or more trenches are etched into the substrate. At least one of the trenches is lined with a first barrier material, and then filled with a waveguide material. At least some of the waveguide material is doped with one or more rare earth elements. A second barrier material is then formed over the waveguide material, with the second barrier material contacting the first barrier material along sidewalls of the at least one trench.

BRIEF DESCRIPTION OF THE DRAWINGS

Preferred embodiments of the invention are described below with reference to the following accompanying drawings.

FIG. 1 is a diagrammatic, cross-sectional top view of an optical device assembly in accordance with an exemplary aspect of the present invention.

FIG. 2 is a diagrammatic, cross-sectional view along the line 2-2 of FIG. 1.

FIG. 3 is a diagrammatic, cross-sectional top view of an optical device assembly in accordance with another exemplary aspect of the present invention.

FIG. 4 is a diagrammatic, cross-sectional view of a fragment of a semiconductor construction at a preliminary processing stage in accordance with an exemplary aspect of the present invention.

FIG. 5 is a view of the fragment of FIG. 4 shown at a processing stage subsequent to that of FIG. 4.

FIG. 6 is a view of the fragment of FIG. 4 shown at a processing stage subsequent to that of FIG. 5.

FIG. 7 is a view of the fragment of FIG. 4 shown at a processing stage subsequent to that of FIG. 6.

FIG. 8 is a view of the fragment of FIG. 4 shown at a processing stage subsequent to that of FIG. 7.

FIG. 9 is a top view of an exemplary construction comprising the fragment of FIG. 8 along the line 8-8.

FIG. 10 is a view of the fragment of FIG. 4 shown at a processing stage subsequent to that of FIG. 8.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention includes optical waveguides and optical amplifiers, and methods of forming optical waveguides and optical amplifiers. In some aspects of the invention, it is recognized that rare earth elements can be utilized to amplify optical signals. The rare earth elements can be incorporated into optical interconnects, and in particular aspects into integrated circuit optical interconnects, to maintain signal strength of optical signals migrating along the optical interconnects. In some aspects, the rare earth elements can be utilized to amplify optical signal strength within at least a segment of an optical interconnect.

In some aspects, the rare earth elements can be considered to be incorporated within light-conducting conduits, with the term "light-conducting conduit" being utilized to generically refer to any device having a path for light, including optical waveguides and optical amplifiers.

A mechanism by which rare earth elements can amplify optical signals, or at least assist in maintaining optical signals, is that the elements can produce additional photons having the same phase and trajectory as photons which impact the elements. One aspect of the present invention is a recognition that incorporation of rare earth elements in on-chip integrated circuit optical interconnect waveguides can be advantageous, particularly if the rare earth elements are within silicon nanocrystals. The rare earth elements in silicon nanocrystals dispersed in a dielectric (such as silicon dioxide) can lead to light amplification when the rare earth elements are excited by photons of appropriate energy. For erbium, such can, for example, produce emission at about 1540 nm wavelength at room temperature with an estimated excitation cross-section of $1\times10^{-14}$ per square centimeter. This effect can be utilized to enhance the quantum efficiency by which light is transferred through a material.

Erbium, ytterbium, neodymium and cerium can be particularly suitable for incorporation into dielectric waveguide materials. Erbium ions, for example, have quantum levels that allow excitation at 800 nm wavelength, 980 nm wavelength, and 1480 nm wavelength.

Rare earth elements tend to have low solubility in the commonly-utilized dielectrics of integrated circuitry (such as, for example, silicon dioxide). Such can be beneficial, as interstitial rare earth elements (such as, for example, erbium) will not substantially alter physical properties of the dielectric (for instance, refractive index and dielectric constant).

Incorporation of various amounts and types of rare earth elements within light-conducting conduits can enable properties of the conduits to be tailored for particular applications. Exemplary aspects of the invention are described with reference to FIGS. 1-10.

Figure 1:
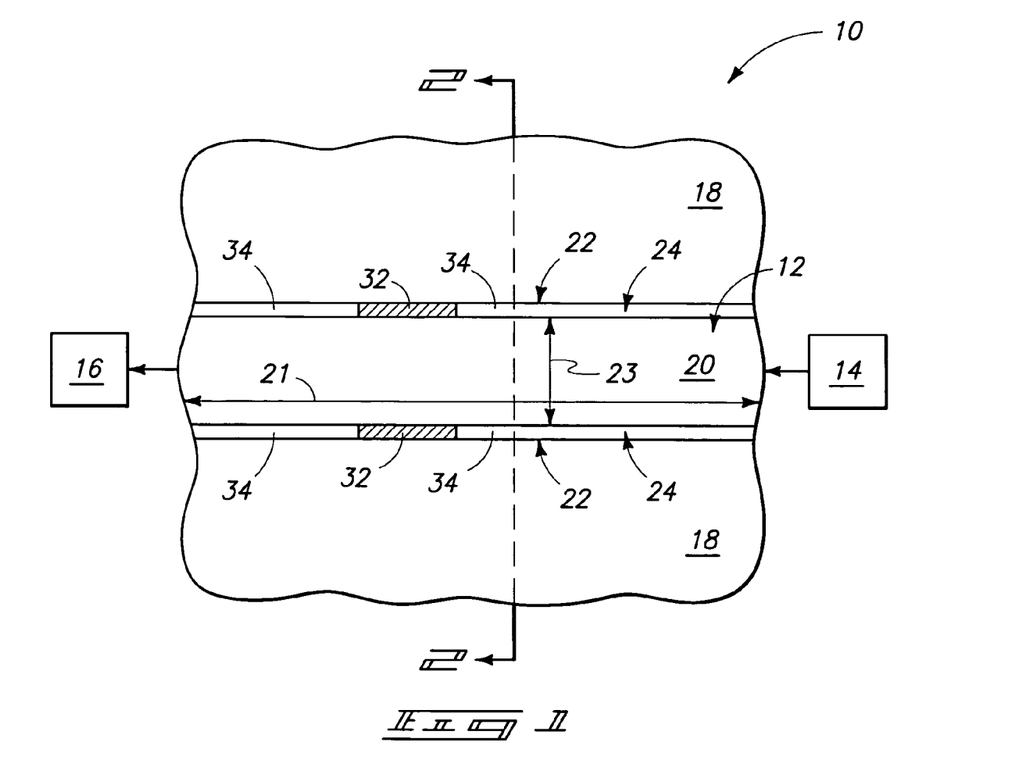
Figure 2:
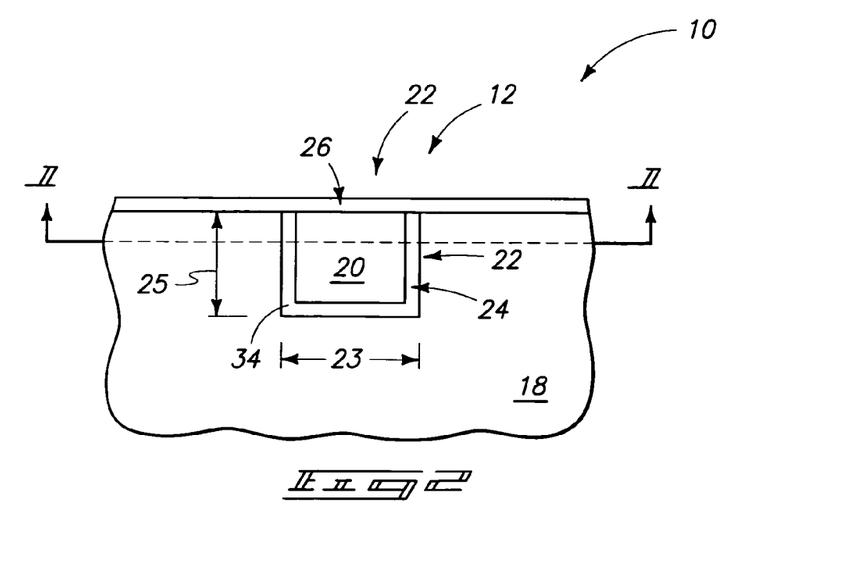

Referring to FIGS. 1 and 2, such illustrate a construction 10 comprising a light-conducting conduit 12 extending from an optical signal input 14 to an optical signal receiver 16.

The optical signal input can be anything that directs an optical signal into conduit 12, and the optical signal receiver 16 can be anything into which an optical signal from conduit 12 is fed. For instance, in some aspects the input 14 can correspond to a fiber-optic cable, and appropriate lenses and/or other devices can be provided between the input and conduit 12 so that an optical signal from the fiber-optic cable is transferred to conduit 12. Similarly, in some aspects the receiver 16 can correspond to a fiber-optic cable, and appropriate lenses and/or other devices can be provided between the receiver and conduit 12 so that an optical signal from the conduit is transferred to the fiber-optic cable. As another example, input 14 can correspond to a high-frequency processor directing an optical data signal to conduit 12, and receiver 16 can correspond to a system configured to store or utilize the data contained in the optical data signal.

The light-directing conduit 12 is shown to be supported by a substrate 18. Such substrate can be anything suitable for supporting the light-directing conduit, and in some aspects can comprise monocrystalline silicon. In such aspects, the substrate can be referred to as a semiconductor substrate. To aid in interpretation of the claims that follow, the terms "semiconductive substrate" and "semiconductor substrate" are defined to mean any construction comprising semiconductive material, including, but not limited to, bulk semiconductive materials such as a semiconductive wafer (either alone or in assemblies comprising other materials thereon), and semiconductive material layers (either alone or in assemblies comprising other materials). The term "substrate" refers to any supporting structure, including, but not limited to, semiconductive substrates. It can be advantageous for the substrate to be a semiconductor substrate, in that such can allow semiconductor processing technologies to be utilized for fabrication of the light-directing conduit.

If the substrate 18 is a semiconductor substrate, the substrate can homogeneously be a semiconductor composition (as shown), or can comprise multiple layers of different compositions. If the substrate is homogeneously a semiconductor composition, the substrate can, for example, comprise, consist essentially of or consist of monocrystalline silicon. If the substrate comprises multiple layers, one or more of the layers can comprise, consist essentially of, or consist of monocrystalline silicon, and others of the layers may or may not comprise semiconductor materials. For instance, other layers may comprise dielectric materials, metallic materials, or electrically-conductive metal-containing compositions. In aspects in which the substrate comprises multiple layers, the conduit 12 can be formed in any suitable layer, or can extend through more than one layer.

The light-directing conduit 12 is shown to comprise an inner material 20 and a sheath 22 surrounding such inner material. In the shown aspect, the light-conducting conduit extends into substrate 18. The sheath comprises a first portion 24 between inner material 20 and substrate 18, and a second portion 26 over the inner material 20 and substrate 18. The first and second portions 24 and 26 can comprise the same composition as one another, or can differ from one another in composition. Further, although the first and second portions 24 and 26 are shown to be homogeneous, it is be understood that at least one of the portions can comprise multiple differing compositions arranged as various segments or layers within such portion.

The inner material 20 can be considered to be the optical waveguide of the light-conducting conduit 12. Light migrates through the inner material. The particular wavelengths of light which migrate through the inner material can be determined by the composition of the inner material, as will be recognized by persons of ordinary skill in the art. One aspect of the present invention is a recognition that inclusion of one or more rare earth elements (in other words, one or more of the elements selected from the group consisting of cerium, praseodymium, neodymium, promethium, samarium, europium, gadolinium, terbium, dysprosium, holmium, erbium, thulium, ytterbium and lutetium) within the inner material can enhance stability of an optical signal migrating through the inner material. In some aspects, the inner material can comprise a matrix having one or more rare earth elements dispersed therein, with a total concentration of the one or more rare earth elements within at least a portion of the matrix being at least about $1\times10^{16}$ atoms/cm$^3$.

The matrix can comprise any suitable composition or combination of compositions, and in some aspects will comprise one or more of silicon dioxide, silicon-oxide-containing glass (for instance, borophosphosilicate glass (BPSG), phosphosilicate glass (PSG) and fluorosilicate glass (FSG)), silicon nitride, indium tin oxide and zinc tin oxide. The silicon-oxide-containing glasses can be considered to be doped silicon dioxide, and in some aspects can be considered to consist of silicon dioxide and one or more of phosphorus, fluorine and boron.

The rare earth elements can be provided to any suitable concentration within the inner material matrix to assist in maintaining stability of an optical signal migrating through the inner material matrix (or, if desired, to amplify an optical signal migrating through the inner material matrix). The rare earth elements will typically be provided to a concentration less than or equal to the solid solubility limit of the rare earth elements within the inner material matrix, which will typically mean that a total concentration of the rare earth elements will be less than or equal to about $1 \times 10^{18}$ atoms/cm$^3$. In exemplary aspects, a total concentration of the rare earth elements within the inner material matrix will be from about $1 \times 10^{16}$ atoms/cm$^3$ to about $1 \times 10^{18}$ atoms/cm$^3$. In some aspects, a particular rare earth element will be the only rare earth element provided within the inner material matrix, or at least will be the only rare earth element present within limits of fabrication techniques. If a particular rare earth element is the only rare earth element present within limits of fabrication techniques, such rare earth element can be considered to be substantially solely the only rare earth element present within the inner material. In some aspects, it can be advantageous for the inner material matrix to substantially solely comprise erbium or cerium.

In some aspects, the earth elements can be provided within silicon nanocrystals present within the inner material matrix. For instance, erbium can be present in the inner material matrix within erbium-rich (or erbium-doped) silicon nanocrystals.

Sheath 22 is configured to substantially keep light migrating along a path defined by the inner material 20. The sheath will typically comprise one or more compositions having a refractive index different from the refractive index of the inner material 20 adjacent such compositions. The difference between the refractive index of the sheath and that of the inner material adjacent the sheath can help retain light along a path defined by the inner material, as will be recognized by persons of ordinary skill in the art.

The composition, or compositions, of sheath 22 can be anything suitable for helping to retain light along a path defined by inner material 20. For instance, if inner material 20 comprises silicon dioxide, the portion of sheath 22 adjacent the silicon oxide can comprise silicon nitride and/or metallic materials and/or metal-containing compositions. In the shown aspect the invention, sheath 22 comprises segments of non-metallic material 34, and segments of metallic material 32. The metallic material 32 can be any suitable composition or combination of compositions, and in particular aspects can comprise one or more of aluminum, tungsten, copper, and metallic silicides (for example, titanium silicide and tungsten silicide).

The waveguide 20 can be considered to have a longitudinal dimension extending along a longitudinal axis 21 (FIG. 1), and to have lateral dimensions (for instance, the lateral dimensions 23 and 25 of FIGS. 1 and 2) which are orthogonal to the longitudinal dimension. In the shown aspect of the invention, sheath 22 extends entirely around the lateral dimensions of waveguide 20, and accordingly entirely surrounds such lateral dimensions.

Figure 3:
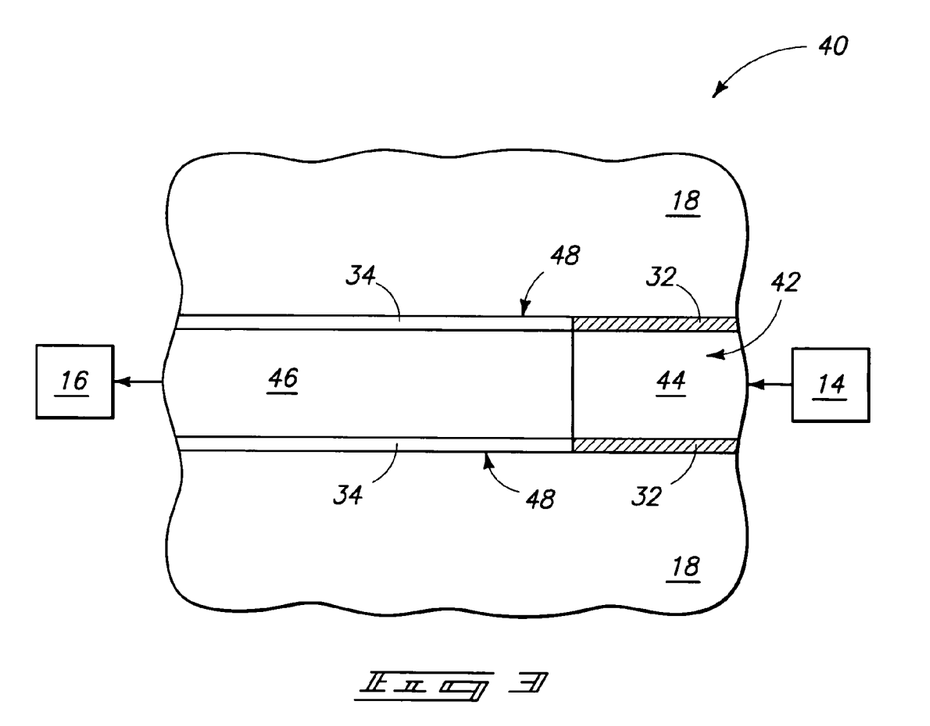

In some aspects of the invention, the inner material 20 will have a region (or segment) doped with a sufficient concentration of one or more rare earth elements to amplify an optical signal (which will typically be a total concentration of at least about $1 \times 10^{16}$ atoms/cm$^3$ of the rare earth elements), and will have another region (or segment) which is not doped to any significant amount with rare earth elements (or in other words, which has a total concentration of rare earth elements of less than $1 \times 10^{15}$ atoms/cm$^3$). Such aspect of the invention is illustrated in FIG. 3. In referring to FIG. 3, similar numbering will be used as is utilized above in describing FIGS. 1 and 2, where appropriate.

FIG. 3 shows a construction 40 comprising a light-conducting conduit 42 supported by a substrate 18. The substrate 18 can be identical to that described previously with reference to FIGS. 1 and 2. The optical signal input 14 and optical signal receiver 16 discussed above are shown proximate light-conducting conduit 42. An optical signal provided from input 14 passes through conduit 42 to the receiver 16, and accordingly a path of light through the conduit can be considered to proceed downstream from input 14 to receiver 16.

The light-conducting conduit 42 comprises two adjacent segments 44 and 46 of a waveguide, with the segment 44 being upstream of the segment 46 relative to the flow of light through the conduit to the receiver 16. In particular aspects of the invention, the upstream segment 44 can be doped with a sufficient concentration of one or more rare earth elements to amplify an optical signal (which typically will be a total concentration of at least about $1 \times 10^{16}$ atoms/cm$^3$ of the rare earth elements; and can be a total concentration of the rare earth elements of from about $1 \times 10^{16}$ atoms/cm$^3$ to about $1 \times 10^{18}$ atoms/cm$^3$), while the downstream segment 46 is not doped to any significant amount with rare earth elements (which typically will be a total concentration of rare earth elements of less than $1 \times 10^{15}$ atoms/cm$^3$). In such aspects, the construction 40 can be considered to comprise an optical signal propagation assembly. The upstream segment 44 of such assembly can be considered an optical signal amplifier which receives an optical signal from input 14 and utilizes the rare earth elements therein to amplify the signal prior to passing the signal through the remaining segment 46 of the conduit to the receiver 16.

The segments 44 and 46 of the waveguide can comprise compositions similar to those discussed above regarding waveguide 20, and specifically can comprise dielectric matrix material having one or more rare earth elements dispersed therein. In specific aspects, at least some of such earth elements can be provided in rare-earth-element-rich silicon nanocrystals. Any suitable rare earth elements or combinations of rare earth elements can be utilized. In some aspects, one or more of erbium, cerium, neodymium and ytterbium will be utilized.

In some aspects, the dielectric matrix material of segment 44 will differ from that of segment 46. For instance, it can be advantageous to utilize one or both of indium tin oxide and zinc tin oxide as the dielectric matrix material of the optical amplification segment 44, and to utilize other materials as the dielectric matrix material of segment 46. Accordingly, in some aspects of the invention the segment 44 will comprise one or both of indium tin oxide and zinc tin oxide, and the segment 46 will not comprise indium tin oxide or zinc tin oxide. In such aspects, the dielectric matrix material of segment 46 can, for example, comprise one or more of silicon dioxide, doped silicon dioxide, and silicon nitride.

A sheath 48, similar to the sheath 22 discussed above with reference to FIGS. 1 and 2, is shown along lateral edges of segments 44 and 46. The exemplary sheath 48 has metallic regions 32 and non-metallic regions 34. Such exemplary sheath is shown to indicate that the sheath utilized in the construction of FIG. 3 can, like the sheath utilized in the construction of FIGS. 1 and 2, comprise non-metallic segments, metallic segments, or combinations of non-metallic segment and metallic segments. Although the metallic material of sheath 48 is shown adjacent the segment 44 enriched in rare earth elements, it is to be understood that portions of the sheath adjacent the segment 46 can also be metallic. However, in some aspects of the invention it can be advantages to provide metallic regions of the sheath along regions of the conduit 42 that comprise one or both of indium tin oxide and zinc tin oxide.

The sheath 48 of FIG. 3 can entirely laterally surround the waveguide containing segments 44 and 46 analogously to the way that the sheath 22 entirely laterally surrounds the waveguide 20 of FIGS. 1 and 2.

An exemplary method for forming an exemplary optical signal conduit of the present invention is described with reference to FIGS. 4-10. In referring to FIGS. 4-10, similar numbering will be used as is utilized above in describing FIGS. 1-3, where appropriate.

Figure 4:
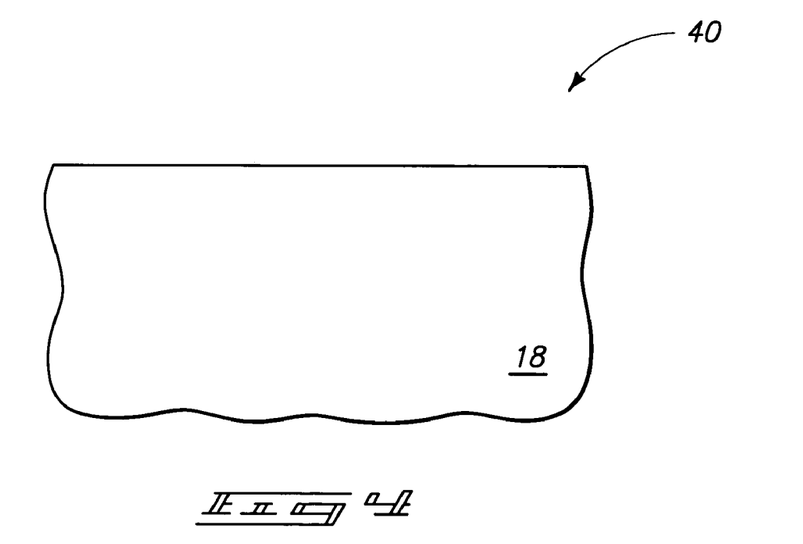

Referring to FIG. 4, a construction 40 is shown to comprise a substrate 18. Such substrate can be a semiconductor substrate, and in some aspects can comprise, consist essentially of, or consist of bulk monocrystalline silicon.

Figure 5:
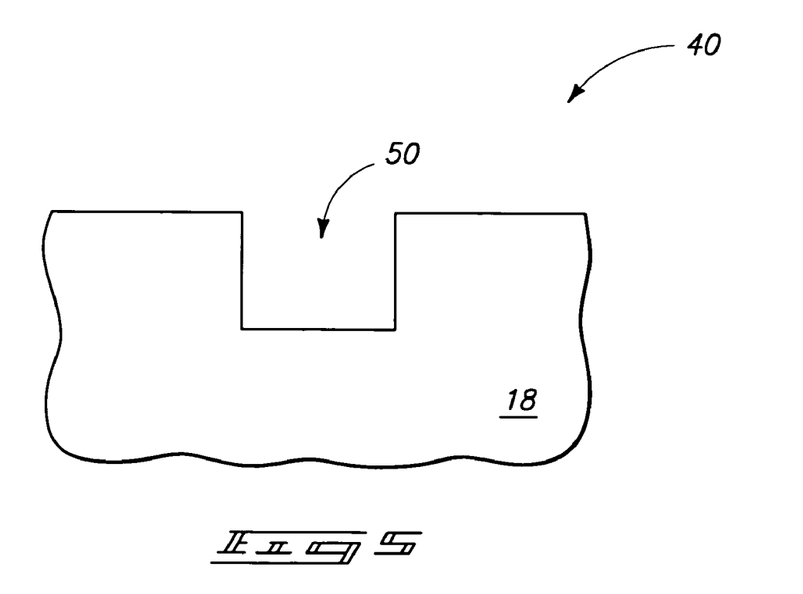

Referring next to FIG. 5, a trench 50 is etched into substrate 18. Although only one trench is shown, it is to be understood that multiple trenches could be simultaneously formed within the substrate. Trench 50 can be formed with any suitable processing, including, for example, provision of a photolithographically patterned mask (not shown) defining the location of the trench; an etch into the substrate to form the trench in the location defined by the mask; and subsequent removal of the mask to leave the structure shown in FIG. 5.

Figure 6:
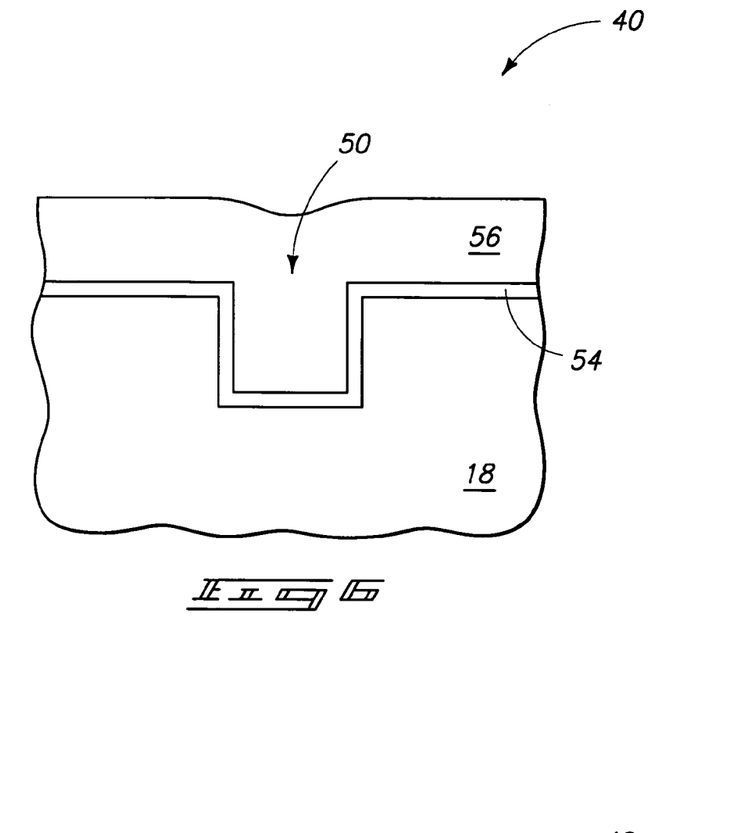

Referring next to FIG. 6, trench 50 is lined with a barrier material 54, and the lined trench is then filled with waveguide material 56. In applications in which multiple trenches are formed at the processing stage of FIG. 5, all of the trenches can be lined with material 54 and filled with material 56, or alternatively fewer than all of the trenches can be lined with material 54 and/or filled with material 56. Barrier material 54 is a barrier relative to light traveling down a waveguide comprising material 56. The barrier may absolutely impede light from escaping for the waveguide, but more typically only partially impedes light from escaping from the waveguide.

Barrier material 54 ultimately forms the sheath discussed above, and accordingly can comprise the same compositions as described previously for the sheathing materials of FIGS. 1-3. Thus, the barrier material can, for example, comprise silicon nitride or other non-metallic materials and/or can comprise various metallic materials.

Waveguide material 56 ultimately forms a light-conducting conduit analogous to the light-conducting conduits discussed above, and accordingly can comprise the same compositions as described previously for the light-conducting conduits of FIGS. 1-3. Thus, the waveguide material can, for example, comprise, consist essentially of, or consist of one or more of silicon dioxide, doped silicon dioxide, silicon nitride, indium tin oxide, and zinc tin oxide.

Figure 7:
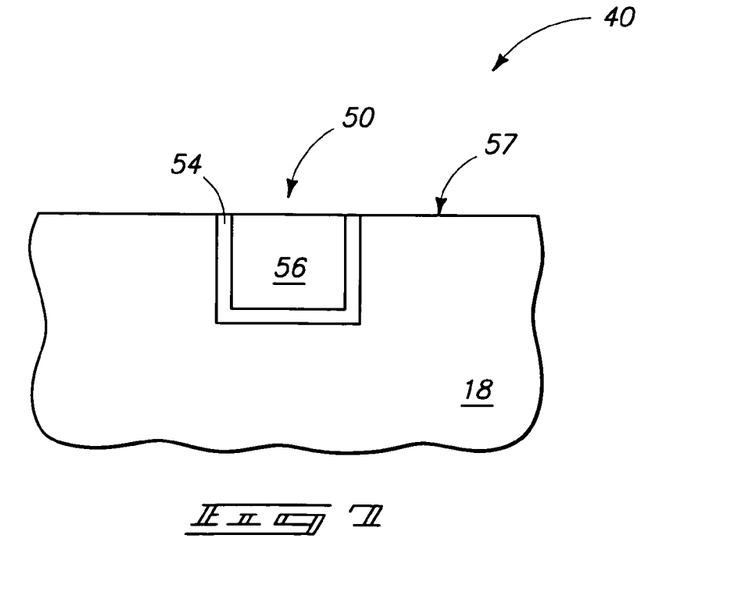

Referring to FIG. 7, materials 54 and 56 are subjected to planarization (such as, for example, chemical-mechanical polishing) to form a planarized upper surface 57 extending across substrate 18 and materials 54 and 56. The planarization can, in some aspects, remove some of substrate 18 so that the planarized surface 57 is elevationally below an initial uppermost surface of substrate 18, and in other aspects can substantially stop upon reaching an uppermost surface of substrate 18.

Figure 8:
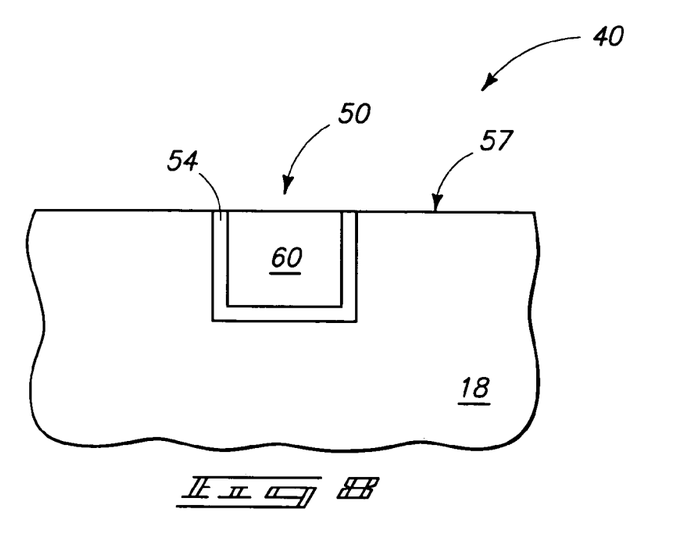

Referring to FIG. 8, waveguide material 56 (FIG. 7) is exposed to one or more rare earth elements to convert the material to rare-earth-element-doped material 60. Although the doping with rare earth elements is shown occurring after the planarization of FIG. 7, it is to be understood that the invention also includes aspects (not shown) in which such doping occurs before the planarization.

Any suitable method can be utilized for incorporating desired rare earth elements into the waveguide material. For instance, dopant can be implanted into the material. In an exemplary aspect, chlorides of one or more rare earth elements are implanted into the material utilizing an implantation energy of from about 100 KeV to about 300 KeV, and an implant dose of from about $1\times10^{13}$ atoms/cm$^2$ to about $1\times10^{15}$ atoms/cm$^2$. Such implantation can achieve the desired dose of rare earth element within the waveguide material of from about $1\times10^{16}$ atoms/cm$^3$ to about $1\times10^{18}$ atoms/cm$^3$. The implantation can be followed with an anneal at, for example, a temperature of from about 500° C. to about 700° C. for a time of from about 10 minutes to about 30 minutes to diffuse the implanted rare earth elements within the waveguide material. In a particular aspect, the implanted rare earth element can be erbium, and the chloride can therefore be erbium chloride. If the implanted rare earth element is entirely erbium, the dopant within the waveguide material can be solely erbium; and if the implanted rare earth element is at least nearly entirely erbium, the dopant within the waveguide material can be at least substantially solely erbium.

In another aspect, the waveguide material can be doped by exposing the waveguide material to an acidic solution having rare-earth-element-containing material dissolved therein. Such acidic solution can, for example, correspond to a solution formed of a 1:1 volume dilution of 36% (by weight) HCl in water, having one or more of erbium oxide ($Er_2O_3$), cerium oxide ($CeO_2$), or various organic/rare earth element compounds dissolved therein. The doping can be followed with the above-described anneal to diffuse the rare earth elements within the waveguide material.

Regardless of the procedure utilized to provide rare earth elements within the waveguide material, some aspects of the invention comprise incorporation of the rare earth elements within silicon nanocrystals of the waveguide material. Such incorporation can occur during the anneal if the waveguide material comprises some silicon. Accordingly, some aspects of the invention will comprise incorporation of some silicon with the dielectric material utilized as waveguide material. In such aspects, the waveguide material can primarily comprise one or more of silicon dioxide, doped silicon dioxide, silicon nitride, indium tin oxide, and zinc tin oxide; and can further comprise sufficient silicon so that silicon nanocrystals are dispersed within the waveguide material in sufficient quantity to incorporate most or all of the rare earth element that is ultimately provided within the waveguide material.

Figure 9:
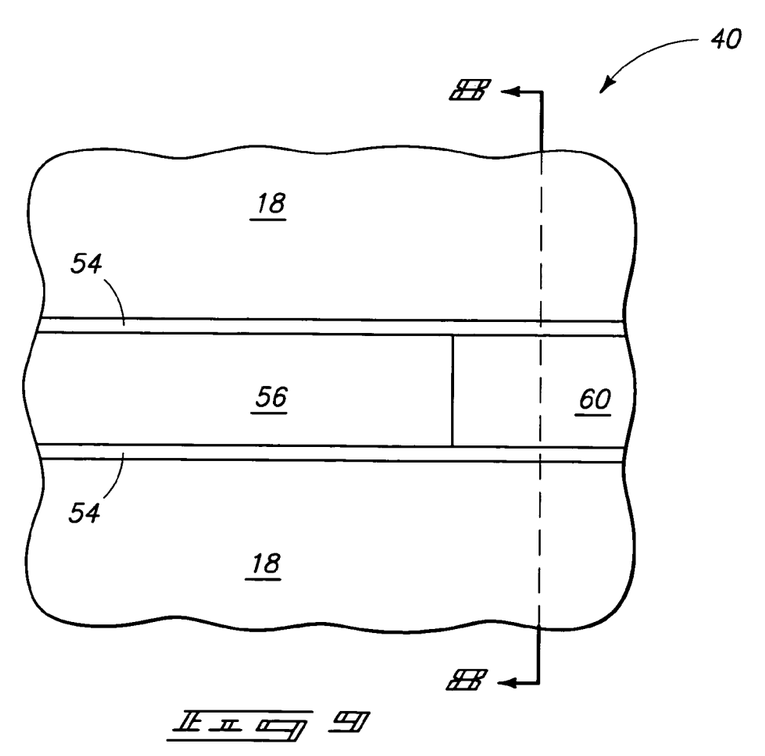

The doping described with reference to FIG. 8 can dope an entirety of the waveguide material, or only a portion of the waveguide material. For instance, some of the waveguide material can be protected with a mask during the doping so that the protected portion is not doped while another portion is doped. FIG. 9 shows a top view of an exemplary construction at the processing stage of FIG. 8 in which one portion of the waveguide material is doped to form the doped material 60, and another portion (or segment) of the waveguide material is not doped (and accordingly remains as the material 56 discussed above with reference to FIGS. 6 and 7).

The construction of FIG. 9 comprises an optical signal propagation assembly analogous to the assembly discussed above with reference to FIG. 3. Specifically, the segment 60 of FIG. 9 can have an identical composition as discussed above for the segment 44 of FIG. 3, and the segment 56 of FIG. 9 can have an identical composition as discussed above for the segment 46 of FIG. 3. Accordingly, in some aspects segment 60 can correspond to one or both of rare-earth-element-doped indium tin oxide and rare-earth-element-doped zinc tin oxide, and segment 56 can correspond to one or more of silicon dioxide, doped silicon dioxide and silicon nitride.

Although barrier material 54 is shown comprising a common composition along the segment 60 as along segment 56, the invention includes some aspects in which the barrier material is different along the doped waveguide material than along the undoped waveguide material. For instance, it may be advantageous to utilize metallic barrier materials along the doped waveguide material comprising indium tin oxide or zinc tin oxide, and to utilize non-metallic barrier materials along the undoped waveguide material comprising silicon dioxide, doped silicon dioxide and/or silicon nitride.

Figure 10:
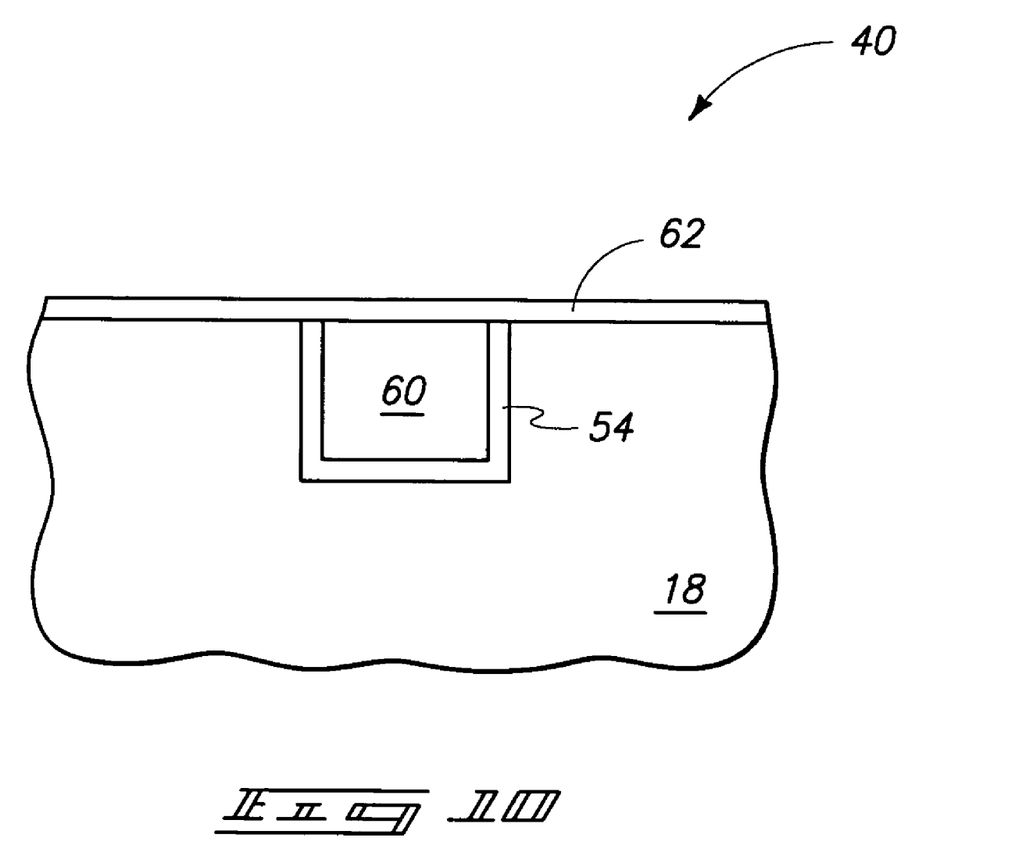

Referring to FIG. 10, the cross-section of FIG. 8 is shown at a processing stage subsequent that of FIGS. 8 and 9, and specifically is shown after a second barrier material 62 is formed across the planarized surface 57. The second barrier material contacts the first barrier material along sidewalls of the trench 50 (such trench is described above with reference to FIG. 5). The second barrier material can, like the first barrier material, comprise a single composition, or can comprise segments of differing composition. The second barrier material can, in some aspects, be compositionally the same as the first barrier material where the second barrier material contacts the first barrier material.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A light-directing conduit, comprising:
   an inner material through which light migrates;
   a sheath around the inner material and configured to substantially keep light migrating along a path defined by the inner material;
   wherein the inner material comprises a matrix having one or more rare earth elements dispersed therein; a total concentration of the one or more rare earth elements within at least a portion of the matrix being at least about $1\times10^{16}$ atoms/cm$^3$; and
   wherein the inner material comprises:
      a first segment containing a total concentration at least about $1\times10^{16}$ atoms/cm$^3$ of the one or more rare earth elements; and
      a second segment downstream of the first segment along the path of the light along the inner material, with said second segment containing a total concentration of less than $1\times10^{15}$ atoms/cm$^3$ of the one or more rare earth elements.

2. The light-directing conduit of claim 1 further comprising a region upstream of the first segment along the path of the light; the conduit being configured so that an optical signal passes from the upstream region to the first segment; the first segment amplifies the optical signal, and the amplified optical signal then passes into the second segment.

3. The light-directing conduit of claim 1 wherein the dielectric composition of the first segment comprises one or both of indium tin oxide and zinc tin oxide; and wherein the dielectric composition of the second segment does not comprise either indium tin oxide or zinc tin oxide.

4. The light-directing conduit of claim 3 wherein the dielectric composition of the second segment comprises one or more of silicon dioxide, doped silicon dioxide, and silicon nitride.

5. The light-directing conduit of claim 1 wherein the one or more rare earth elements comprise erbium.

6. The light-directing conduit of claim 1 wherein the one or more rare earth elements are substantially solely erbium.

7. The light-directing conduit of claim 1 wherein the sheath comprises metallic segments and non-metallic segments.

8. A semiconductor construction, comprising:
   a semiconductor substrate;
   a waveguide supported by the substrate and comprising one or more rare earth elements, with the one or more rare earth elements being present to a total concentration of at least $1\times10^{16}$ atoms/cm$^3$ within at least one segment of the waveguide; and
   wherein the waveguide comprises:
      a first segment containing the one or more rare earth elements; and
      a second segment substantially not containing the one or more rare earth elements.

9. The construction of claim 8 wherein the second segment is downstream of the first segment along a path of light along the waveguide.

10. The construction of claim 9 wherein the first segment comprises one or both of indium tin oxide and zinc tin oxide; and wherein the second segment does not comprise indium tin oxide or zinc tin oxide.

11. The construction of claim 9 further comprising an optical signal conduit configured to provide an optical signal input to the first segment; and wherein the first segment is an optical amplifier configured to amplify the optical signal input and feed the amplified optical signal into the second segment.

* * * * *